Sept. 6, 1927.

F. M. REID 1,641,354

LOCKING DEVICE FOR SEMITRAILERS

Filed July 9, 1926

INVENTOR.
Frederick Malcolm Reid.
BY
Stuart C Barnes
ATTORNEY.

Patented Sept. 6, 1927.

1,641,354

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

LOCKING DEVICE FOR SEMITRAILERS.

Application filed July 9, 1926. Serial No. 121,288.

This invention relates to a device for locking a semi-trailer to a tractor and has to do particularly with a lock in which certain operations are automatically accomplished.

Semi-trailers are provided with wheels for supporting the rear end, and the forward end is supported by a tractor which draws the trailer. The trailer is usually detachable from the tractor, and many trailers include a supporting frame which supports the forward end of the trailer when it is detached from the tractor.

According to the present invention the semi-trailer is provided with a locking device for engaging a co-operating member on the tractor for detachably securing the semi-trailer to the tractor. This locking device is operable to lock the semi-trailer to the tractor when the tractor backs into the semi-trailer. The lock is constructed so as to release the tractor, when desired, by forward movement of the tractor. The lock is so constructed that a single operation is all that is required on the part of an operator to accomplish the several movements and operations of the lock. When a tractor becomes detached from the trailer, the lock assumes a position ready to receive a tractor which is subsequently backed into the semi-trailer, and at the same time the lock is automatically set so that when a tractor is backed into the trailer, it automatically operates to lock the trailer to the tractor.

Figure 1:
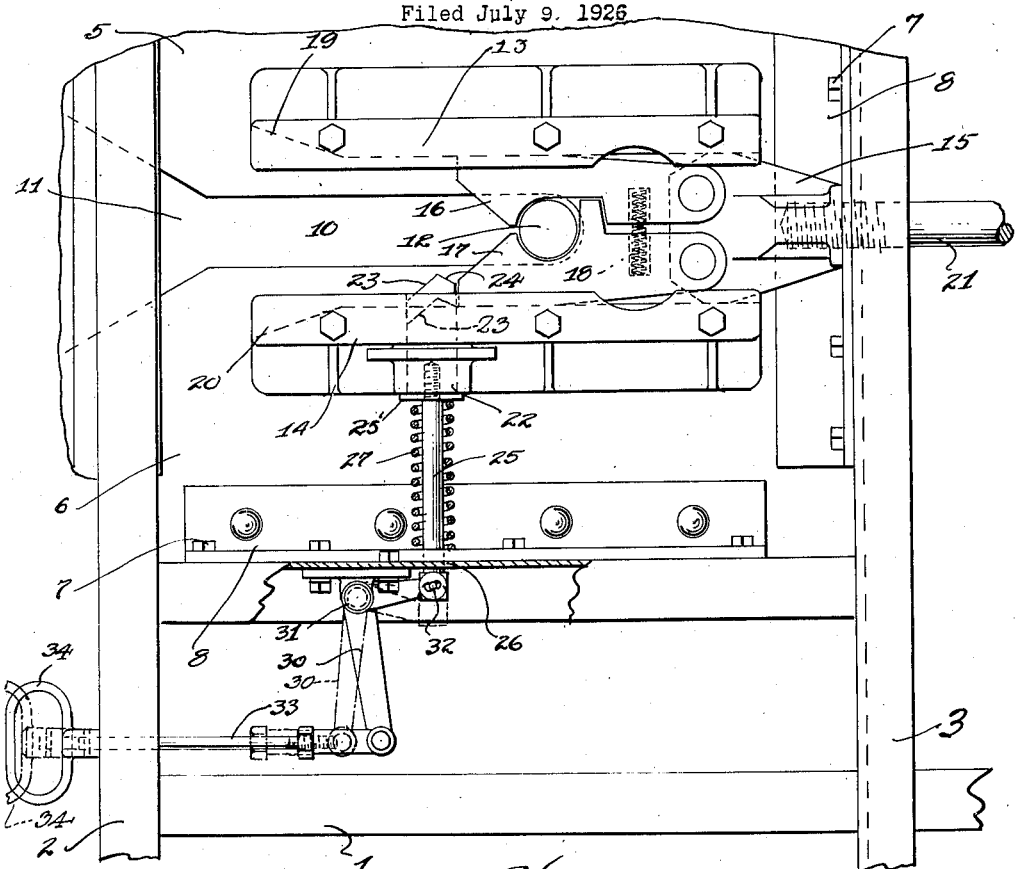
Fig. 1 is a plan view of the lock construction.

Referring to the drawings, the frame of the semi-trailer is shown in part only. The frame includes a longitudinally extended frame member 1 and a front cross member 2. A second cross member 3 of the frame is also shown. The lock construction includes plates 5 and 6 which are bolted to the frame members by means of bolts 7 and angle irons 8. The plates are spaced apart to provide a channel 10, and are shaped so that the channel 10 has an enlarged open end 11. The tractor (not shown) is provided with a fifth wheel construction with a king pin 12 which is received in the channel 10 and locked therein.

The plates 5 and 6 carry guide devices 13 and 14 which have undercut slideways. Disposed within these slideways is a reciprocating lock which includes a head 15 and two pivoted locking devices 16 and 17. The lock is in the form of one which may be termed a clam lock, the two locking devices being shaped to engaged around the king pin 12 to secure the semi-trailer to the tractor. These two locking devices are normally pressed outwardly away from each other by a spring 18. The forward end of the undercut slideways are turned outwardly in a divergent manner, as shown at 19 and 20.

In Fig. 1 the clam lock is shown in locked position engaging the king pin of the tractor. The engaging devices are held towards each other by reason of the slideways and the spring 18 is under compression. In the releasing operation, the clam lock is moved forwardly in the slideways and when the two pivoted engaging members reach the divergent portion of the slideways they separate under the action of the spring 18 to release the king pin. A rod 21 may be secured to the locking head to reciprocate therewith and this rod may extend toward the rear of the semi-trailer and its movement may be utilized for doing work, as for instance, raising or lowering the supporting frame (not shown) as the semi-trailer is engaged or detached from the tractor.

In order to hold the clam lock in locked position a latch 22 is provided. This latch is slidably mounted and the head thereof extends into the path of the reciprocating clam lock. The head of the latch is provided with a slanting surface 23, and a slanting surface 24. The surface 23 is of greater length, and extends farther down on the latch than the surface 24, the purpose of which will presently appear.

Secured to the latch member 22, as by means of screw threads, is a rod 25 which extends through a member of the semi-trailer frame, as shown at 26. A suitable washer or head 25' is fixed to the rod 25, and a spring 27 is positioned between this washer and the frame. The spring normally holds the latch member 22 forwardly in locked position. The rod 25 is connected to a bell crank 30 pivoted to the frame, as at 31.

The connection between the bell crank and the rod may take the form of a pin and slot connection as shown at 32. One arm of the bell crank is connected to a rod 33 and a handle 34 is mounted upon the end of the rod 33 at the front end of the semi-trailer frame. This handle is for the purpose of operation of the latch by an operator. It will be observed that when the handle is pulled outwardly the latch 22 is retracted, and that when the handle moves back the latch moves back into locked position.

Figure 2:
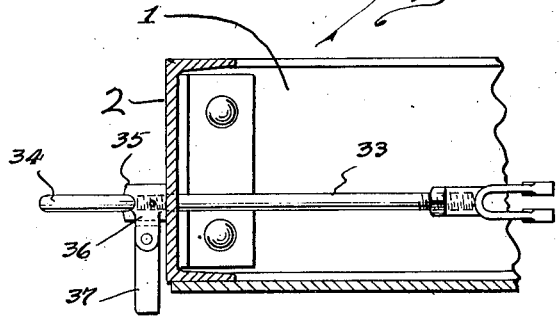
Fig. 2 is an enlarged detail of the operating handle and automatic acting catch.
Figure 3:
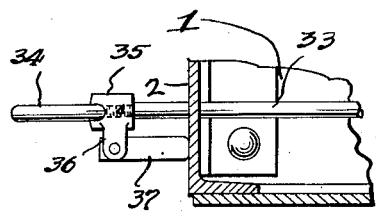
Fig. 3 is a similar view showing the position of a handle when the lock is in position to release a tractor.

As indicated in Figs. 2 and 3, near handle 34 is a portion 35 which is connected to the rod 33. The portion 35 has bifurcated members 36 extending downwardly therefrom. Pivotally mounted between these bifurcated members is a catch 37. The catch 37 need not necessarily be mounted between bifurcated members since it may as well be pivoted to a single projection.

The operation of the apparatus is as follows: When the semi-trailer is locked to a tractor the reciprocating lock is in the position shown in Fig. 1, and the operating handle is in the position shown in Fig. 2. The driver of the tractor pulls the handle 34 forward and swings the catch 37 upwardly to the position shown in Fig. 3 whereupon the handle is released and it is held in outward position by the catch which engages the trailer frame. With the operating handle in this position the latch 22 is in the position as indicated by the dotted lines indicated in Fig. 1. It will be observed that the slanting surface 24 projects in the path of the reciprocating head. The driver of the tractor now moves the same forward. The king pin 12 pulls the reciprocating locking head forward and in doing so it engages the surface 24 as it moves forwardly. This pushes the latch farther back into retractive position and likewise causes the handle 34 to move farther out from the trailer frame, whereupon the latch 37 drops by gravity. When the reciprocating locking head reaches the end of its forward movement, the engaging members separate to release the king pin and the tractor moves away from the semi-trailer. At this time a supporting frame for the semi-trailer has been lowered by the action of the rod 21 and the semi-trailer is supported by this frame.

The clam lock is now in an open or receiving position. Subsequently, when it is desired to again attach the semi-trailer to a tractor, the tractor backs into the trailer and the king pin enters between the engaging members. Further backward movement of the tractor causes the clam lock to move back until such time the latch 22 springs back to the position shown in Fig. 1. During this movement the clam lock is free to move over the slanting surface 23 of the latch. Thus it will be observed that whenever a tractor disengages from a semi-trailer the lock is automatically put into position ready to receive and lock the semi-trailer to a tractor at any subsequent time.

It will be observed that where there is one driver for a tractor which, for instance, is working in conjunction with a number of semi-trailers that the driver need only to leave his seat once in order to manipulate the operating handle and set the catch. He then goes back to his seat and drives the tractor forward thereby releasing the semi-trailer and at the same time releasing the catch. When it is again desired to attach the semi-trailer to the tractor the driver need not leave his seat as the lock is in position to engage the tractor when the same backs into the semi-trailer.

I claim:

1. In a semi-trailer, a locking device for locking the semi-trailer to a tractor, a latch holding the locking device in locking position, means for retracting the latch, and a catch for maintaining the latch in retracted position, said catch being automatically released when the lock disengages the tractor.

2. In a semi-trailer, a locking device for locking the semi-trailer to a tractor, a latch holding the locking device in locking position, means for retracting the latch, and a catch for maintaining the latch in retracted position, said catch being automatically released when the lock disengages the tractor, whereby the latch is free to again hold the locking device when the same locks the semi-trailer to a tractor.

3. In a semi-trailer, a locking device which is movable and which in one position locks the trailer to a tractor, and means for holding the movable lock in locked position, this means being operable to permit the lock to move to open position to release the tractor, the said means being automatically operated as the lock so moves whereby it is placed in position where it will again hold the lock in locked position when it is engaged with a tractor.

4. In a semi-trailer, a reciprocable lock for locking the trailer to a tractor which, at one end of its movement, is in a locked position and at the other end of its movement is in open position, means projecting into the path of the lock to hold it in locked position, means for retracting the projecting means, a catch for holding the projecting means in retracted position, the said catch automatically releasing the projecting means as the lock moves to unlocked position whereby the said projecting means returns to its normal position in the path of the lock.

5. In combination with a tractor and a semi-trailer, a lock for locking the trailer to a tractor, means holding the lock in its locked position which is operable to release the lock and which automatically returns to its locking position when the lock disengages the tractor.

6. In combination with a tractor and a semi-trailer, a lock for locking the trailer to a tractor, means holding the lock in its locked position which is operable to release the lock and which automatically returns to its locking position when the lock disengages the tractor, whereby it is in position to again hold the lock when it is engaged with the tractor.

7. In a semi-trailer, a reciprocable lock for locking the trailer to a tractor, which, at one point in its movement is in locked position and at another point in its movement is in unlocked position, a spring pressed latch projecting into the path of the lock to hold it in locked position, means for retracting the spring pressed latch, a catch for holding the latch retracted, this catch automatically releasing as the lock moves to unlocked position whereby the said latch is free to return to its normal position in the path of the lock.

8. In a semi-trailer, a reciprocable lock for locking the trailer to a tractor, which, at one point in its movement is in locked position and at another point is in unlocked position, a spring pressed latch projecting into the path of the lock to hold the lock in locked position, said latch having an inclined surface, means for retracting the latch, and a pivoted catch which is movable to a position to hold the latch retracted, the said lock, in its movement from locked position to unlocked position, striking the said inclined surface of the latch whereby the latch is further retracted so as to permit the pivoted catch to drop from its holding position whereby the latch is free to return to its normal position in the path of the lock.

In testimony whereof I affix my signature.

FREDERICK MALCOLM REID.